LYDIA M. GOULD.
Improvement in Fly Traps.
No. 124,951.
Patented March 26, 1872.

Scale of one inch for the Trap

Witnesses
Orvil Starr
Geo. S. Pope,

Inventor
Lydia M. Gould
By G. L. Chapin
Atty

UNITED STATES PATENT OFFICE.

LYDIA M. GOULD, OF CHICAGO, ILLINOIS.

IMPROVEMENT IN FLY-TRAPS.

Specification forming part of Letters Patent No. 124,951, dated March 26, 1872; antedated March 14, 1872.

SPECIFICATION.

I, LYDIA M. GOULD, of Chicago, in the county of Cook and State of Illinois, have invented an Improved Fly-Trap, of which the following is a specification:

The present invention consists in providing a suitable box with a sliding door at the under side, and a series of pins depending from the perforated top, so that when the door is being shut the flies will become entangled with the pins, and be thus prevented from escaping; but instead thereof will pass up through the perforated top into a canvas dome, which is at its bottom secured to an elliptical hoop fastened to the top of the box, as the whole is hereinafter fully described and shown.

Figure 1:
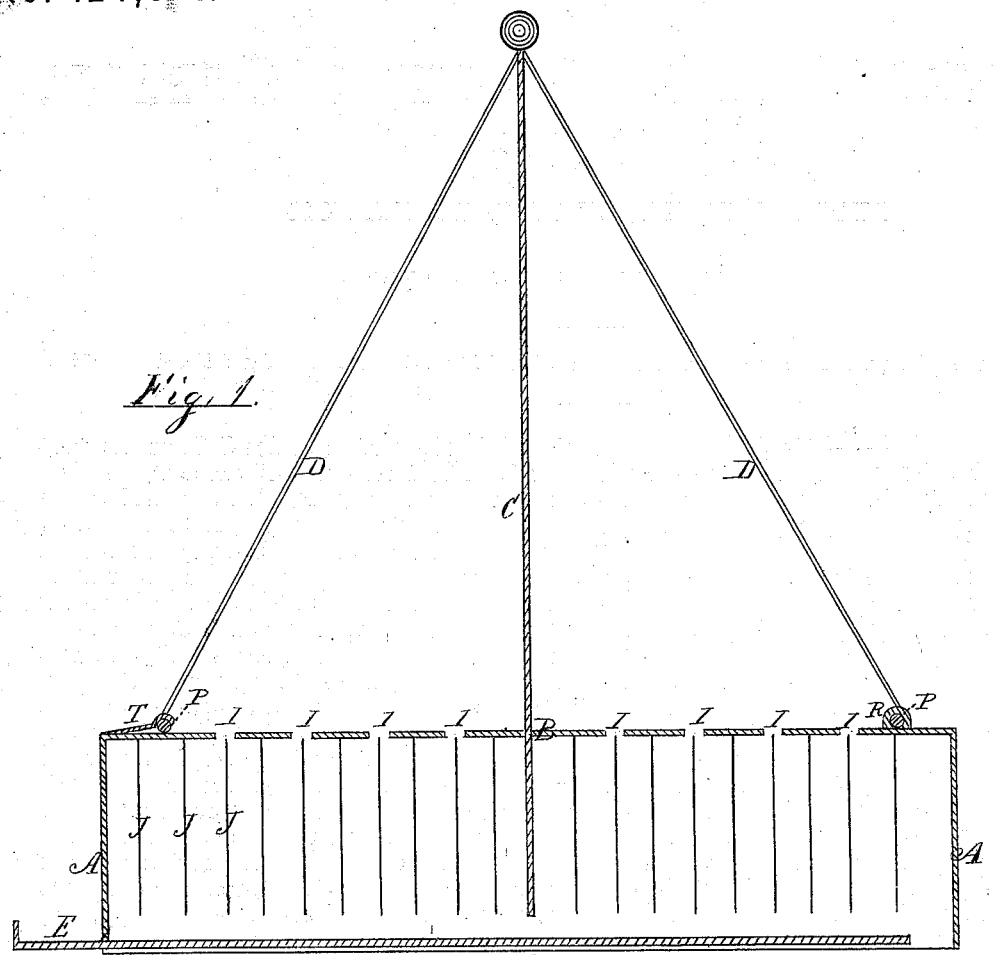
Figure 2:
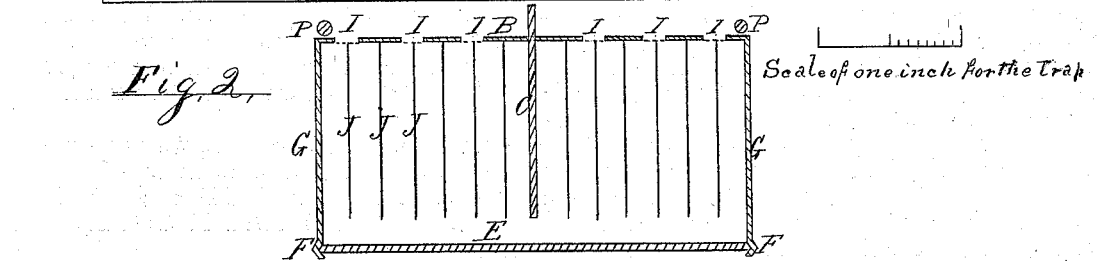
Figure 3:
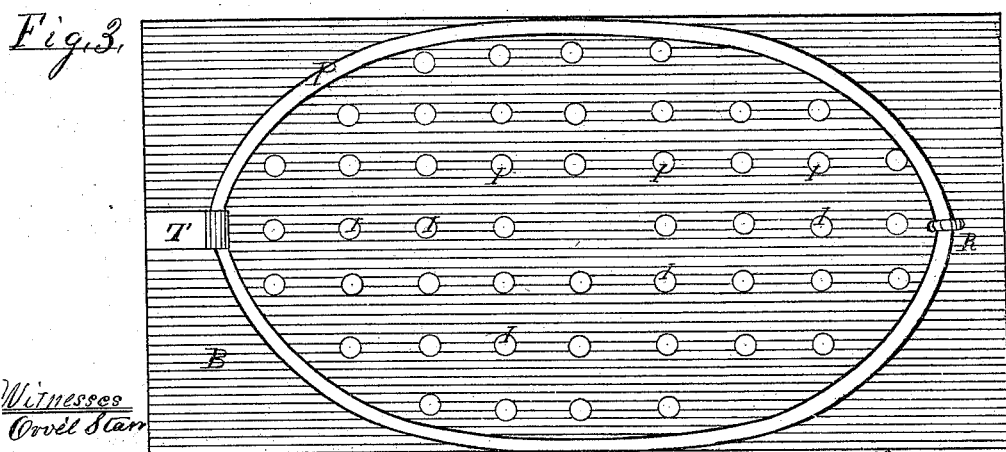

In the drawing, Figure 1 is a longitudinal sectional elevation of my improved fly-trap; Fig. 2, a transverse central section of Fig. 1, with canvas dome removed; Fig. 3, a plan or top view of the trap with canvas dome also removed.

A A represent the ends, and G G the sides of the box, which is provided with a top, B, perforated with a series of holes, I I I, &c., of sufficient size to readily allow flies which are caught in the box to pass up into the canvas dome D. The top B is also provided with a series of depending wire-pins, J J J, &c., which serve to entangle the flies as the sliding door E is being closed, and thus prevent their escape. This door runs in grooves F formed in the lower edges of the sides G G, as shown at Fig. 2. The frame-work of the dome consists of an elliptical hoop, P, which is held to the top B by means of a staple, R, and a spring clamp, T, so that when flies are to be removed from the dome, the hoop can be either lifted off from the box or swung to one end; and it consists of an upright standard, C, which supports the upper part of canvas D D, and projects through the top B, and is held up by friction so as to be removable with the canvas. In the drawing the hoop has an elliptical form, but it may have a form to correspond with the shape of the box. To use the trap, it, with sliding door open, is to be placed over a dish or other place where the flies are thick; then by any sudden movement the flies rise up, at which time the door is closed and the flies driven up into the dome D, which, by being made of open fabric, is much lighter inside than the inside of the box below. The dome is then removed and the flies destroyed.

Having thus described my invention, what I claim, and desire to secure by Letters Patent, is—

The box A A G G B, provided with depending pins J J J, sliding door E, holes I I I, in combination with a dome P C D, as set forth.

LYDIA M. GOULD.

Witnesses:
G. L. CHAPIN,
FRANK HAYWARD.